United States Patent [19]

Fierstein et al.

[11] Patent Number: 5,313,251
[45] Date of Patent: May 17, 1994

[54] PRODUCTION OF SECOND-GENERATION CAMERA-ORIGINAL CONTROL TOOL PHOTOGRAPHS VIA PHOTOGRAPHY OF DIGITALLY GENERATED TRANSPARENCY OF A COMPUTER-ORIGINATED IMAGE

[75] Inventors: William E. Fierstein, Rochester; Thomas E. Madden, East Rochester, both of N.Y.

[73] Assignee: Eastman Kodak Company, Rochester, N.Y.

[21] Appl. No.: 926,470

[22] Filed: Aug. 7, 1992

Related U.S. Application Data

[63] Continuation-in-part of Ser. No. 664,151, Mar. 4, 1991, Pat. No. 5,223,891.

[51] Int. Cl.$^5$ ............................................. G03B 27/32
[52] U.S. Cl. ........................................................ 355/77
[58] Field of Search ................... 354/297, 298, 336; 355/77, 41, 38, 68; 358/76, 80, 298; 364/525, 526

[56] References Cited

U.S. PATENT DOCUMENTS 5,001,512  3/1991  Kubota ........................... 355/77 X
5,083,152  1/1992  Tokuda ........................... 355/38 X
5,157,506  10/1992  Hannah .............................. 358/298

OTHER PUBLICATIONS

*Kodak Color Reproduction Guides*, User's Guide, Q-60, published by Eastman Kodak Company.

Primary Examiner—D. Rutledge
Attorney, Agent, or Firm—Thomas H. Close

[57] ABSTRACT

A method of predictably producing accurate photo-processing and graphic arts control tools, to be used for adjusting the parameters of photographic devices, in which a computer-originated image is digitally recorded onto a first recording medium by a digital output recording device, is illuminated and is photographed onto a second recording medium to yield second-generation camera-original control tool photographs on the second recording medium. One or more of the tone, color or frequency response characteristics of the digitally-generated image on the first recording medium are selectively adjusted, using a digital data transform, so that the second-generation control tool photographs on the second recording medium have the tone, color and frequency response characteristics defined as "aim" for that second medium.

15 Claims, 7 Drawing Sheets

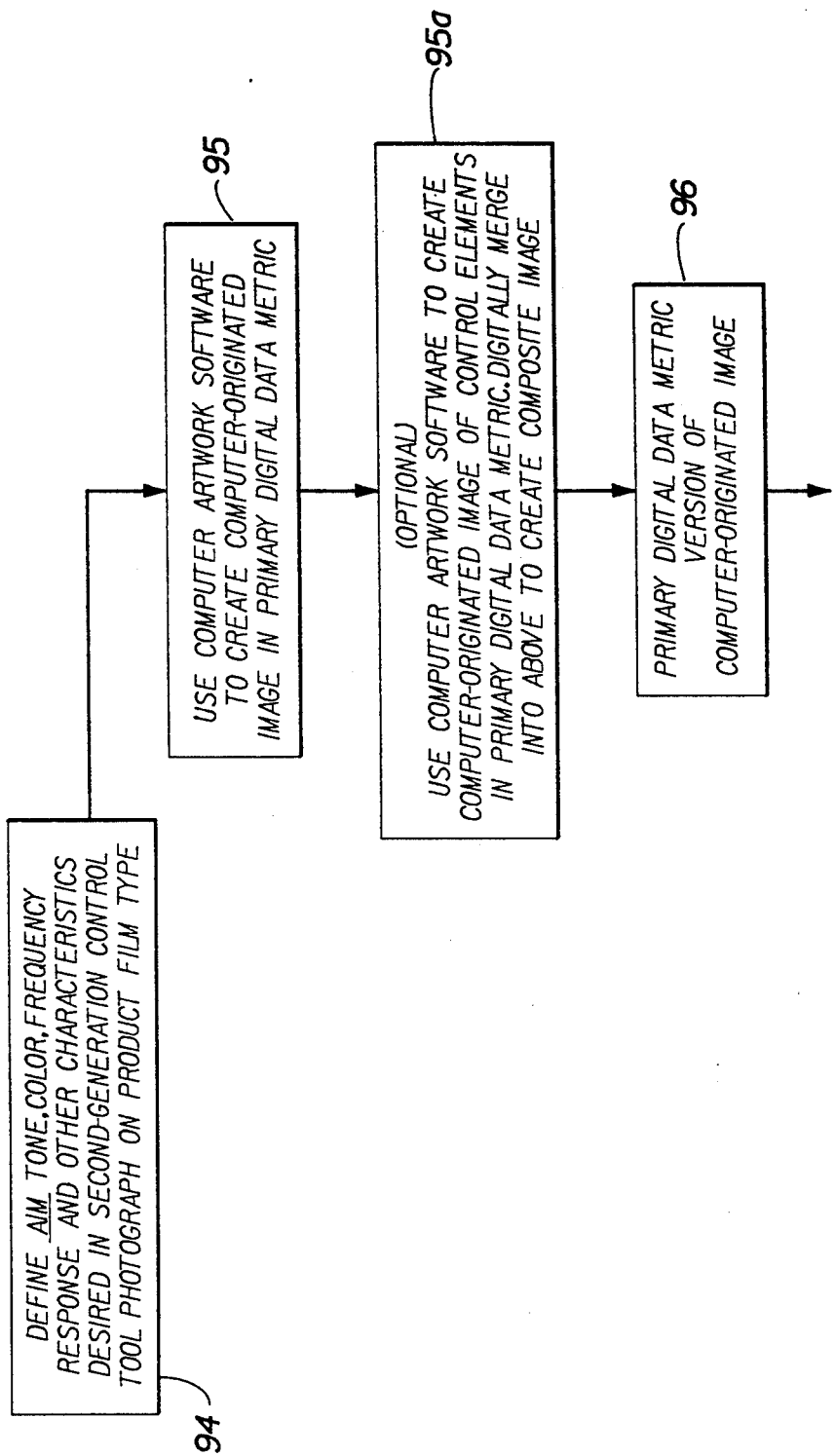

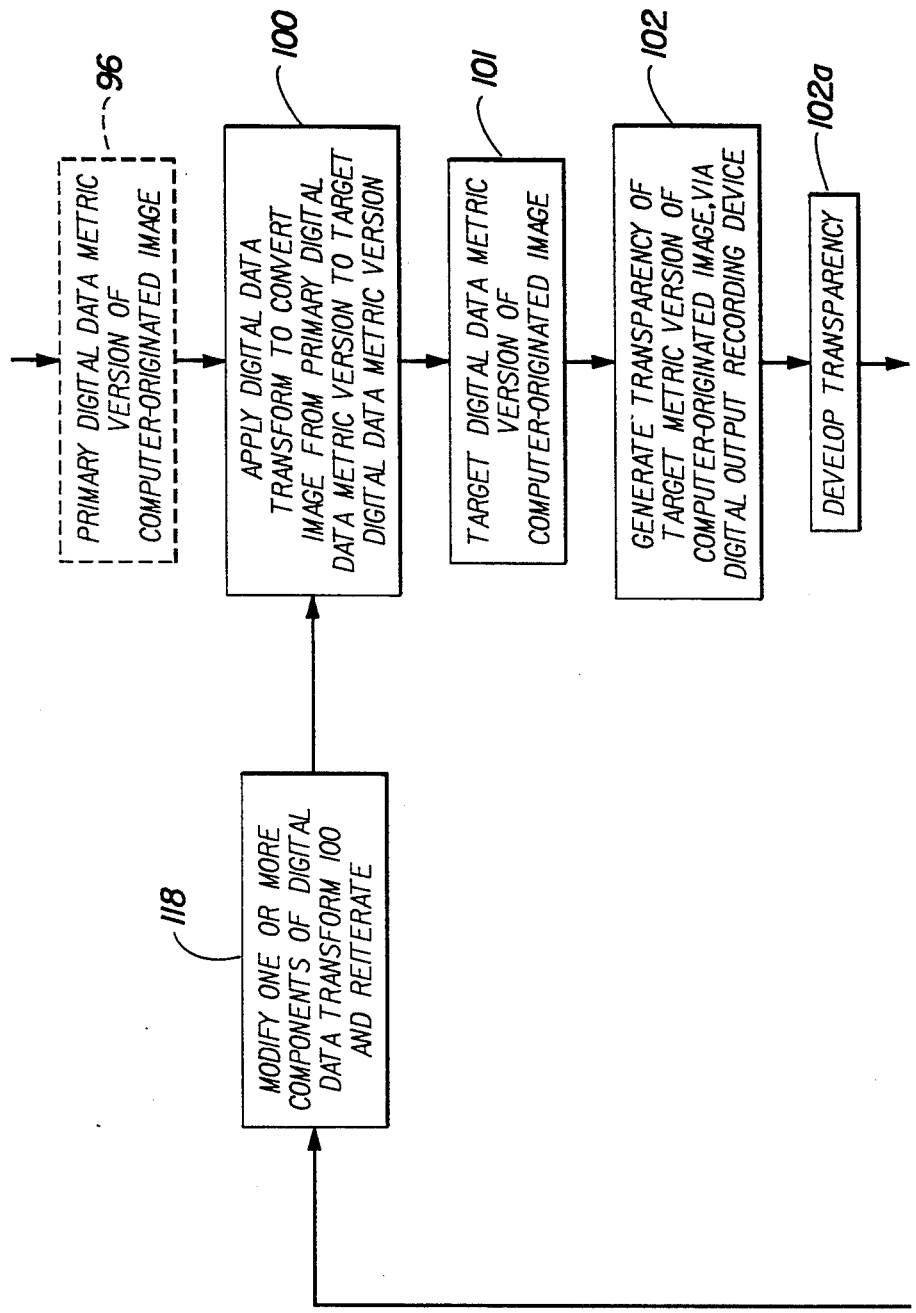

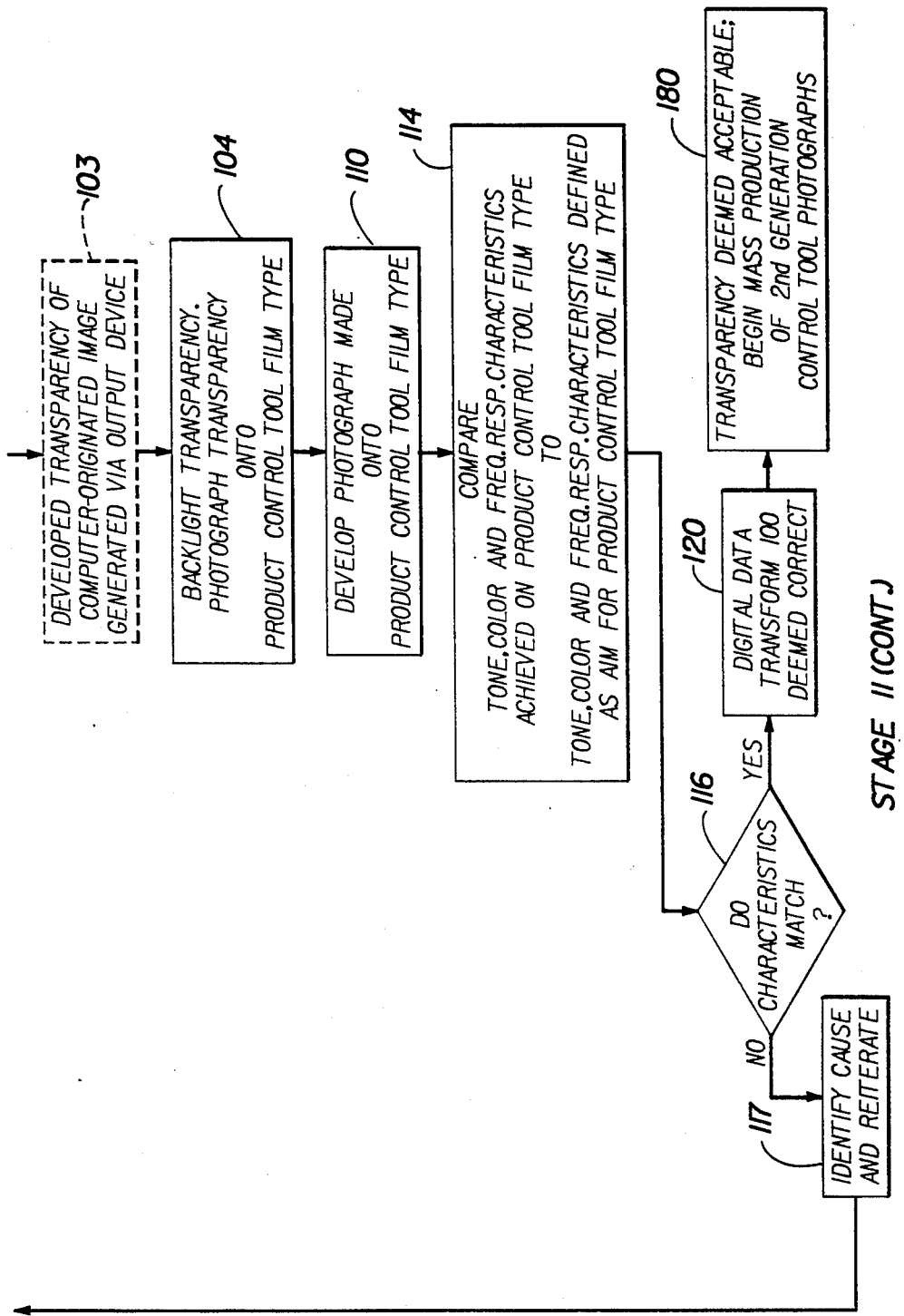

PRODUCTION OF SECOND-GENERATION CAMERA-ORIGINAL CONTROL TOOL PHOTOGRAPHS VIA PHOTOGRAPHY OF DIGITALLY GENERATED TRANSPARENCY OF A COMPUTER-ORIGINATED IMAGE

This is a continuation-in-part of Ser. No. 07/664,151 filed on Mar. 4, 1991, now U.S. Pat. No. 5,223,891.

FIELD OF THE INVENTION

The present invention relates in general to photofinishing and graphic art systems and is particularly directed to a process for repetitively producing consistent, accurate photofinishing and graphic art control tools for calibrating or otherwise adjusting film processing and reproduction equipment, via the photography of digitally-generated images.

BACKGROUND OF THE INVENTION

Photofinishers customarily employ one or more quality control tools, typically in the form of calibrated first-generation camera-original negatives that contain reference portrait images, to make comparison measurements or observations in order to "fine tune" the operation and performance of various pieces of photofinishing equipment. (These calibrated camera-original negatives have come to be referred to as "Shirleys", named after the model photographed during the initial production many years ago).

The graphic art industry has also recognized a need for calibrated camera-original photographs to be used in controlling the operation and performance of their equipment.

Because the contents of these camera-original reference negatives must be specified to extremely high standards, the process conventionally employed to produce them is expensive, labor intensive and time consuming. Some of the same considerations may apply even when the scene does not contain a live model but is comprised of inanimate objects such as color charts.

For the purpose of clarity throughout this document, definitions of the following terms as they will be used throughout this discussion are given below.

The term "negative" will refer to a camera exposure onto a film type from which photographic paper prints are normally produced.

generally speaking, the photographic terms "positive" and "transparency" are interchangeable. For the sake of clarity, in this discussion the term "positive" will be reserved to mean a camera-original exposure onto a reversal film type, from which photographic paper prints are not normally produced, but which are usually viewed via projection.

The term "transparency", will be used to mean that computer-originated image (defined below) which is digitally-generated using a digital output recording device onto a photographic or other non-photographic (e.g., thermal) medium and which is intended to be illuminated and photographed or otherwise captured to produce "second-generation camera-original" exposures, (defined below), whether onto a negative or positive film type or other recording medium. The computer-originated image need not be on a reversal film type, but may be digitally output as a reflection print.

The term "first-generation camera-original" will refer to a photographic exposure that is created in the usual manner, using a conventional camera to photograph a live scene. This camera exposure may be photographed onto either a negative or a positive film type.

The term "computer-originated image" will refer to an image which does not originate as a "live scene", in the conventional sense, but which is digitally created using any one of several computer artwork, computer aided design or digital image rendering software programs. Such images are usually composed of digital picture elements ("pixels") whose values can be stored in the form of a digital data file in a "primary metric" (defined below).

The term "second-generation camera-original" will refer to a photographic exposure that is created using the method embodied within the present invention wherein a transparency produced by a digital output recording device is backlit and photographed using a conventional camera. A second-generation camera-original exposure may be photographed onto either a negative or a positive film type. This term will also include other methods of recording the output of the digital output recording device, such as enlarging. Also, the output of the digital output recording device can be on a medium other than a transparency, such as print paper.

The term "product film type" will refer to that film type or other medium (e.g., thermal) onto which second-generation camera-original product control tool photographs of an illuminated digitally-generated transparency of a computer-originated image are exposed or otherwise captured.

Since second-generation camera-original exposures may be produced on either a negative or positive film type, the term "photograph" will be used to avoid the cumbersome phrase "negative (or positive)" throughout the document.

The term "primary metric" will be used as an abbreviation for the more cumbersome phrase "primary digital image data metric."

The term "target metric" will be used as an abbreviation for the more cumbersome phrase "secondary, target digital image data metric."

The term "develop" will refer to the photochemical processing of an exposure, whether the exposure was created via a camera, a photographic enlarging device, a digital output device or other exposing device.

The term "image characteristics" will be used to minimize the cumbersome phrase "tone, color and frequency response characteristics" throughout. In places where the full phrase lends clarity, the full phrase will appear.

SUMMARY OF THE INVENTION

In accordance with the present invention, the above enumerated drawbacks of a conventional photofinishing and graphic art control tool production scheme are obviated by using digital image processing techniques to obtain a base image in the form of a calibrated digitally-generated transparency of a computer-originated image which may be backlit and repeatedly photographed onto a product film type to predictably obtain precision-quality, calibrated second-generation camera-original photographs whose tone, color and frequency response characteristics (i.e., "image characteristics") match those defined as the "aim" characteristics for said product film type.

Pursuant to the process carried out by the present invention, a computer-originated image is stored in a primary image data metric in a digital image data base.

Selected photoprocessing or graphic arts control and identification elements can be digitally inserted into the primary metric version of the computer-originated image, if desired, to produce a composite digital image. However, if the computer-originated image is already one comprised of photoprocessing or graphic arts control elements, the digital insertion of further control elements may be unnecessary. An example of such a computer-originated image is a chart of 125 colored patches whose pixel values are defined by a 5×5×5 array of trichromatic values stored in a data file, in a primary digital data metric.

A digital data transform is derived and employed to convert the primary metric version of the composite image to a secondary "target" digital image data metric version of the composite image which is, in turn, provided as input to a high spatial resolution digital film output recording device. This digital output recording device produces a digitally-generated transparency which may be backlit and repeatedly photographed onto a product film type to predictably obtain precision-quality, calibrated second-generation camera-original photographs, on the product film type, whose image characteristics match the characteristics defined as the "aim" characteristics for the product film type. In other embodiments of the invention, the digital output device produces a composite image on a recording medium other than a transparency (e.g., a paper print). If the image produced by the digital output recording device is on a reflection medium and not a transparency medium, the image may be illuminated using a frontlighting illumination system.

The digitally-generated transparency is backlit and photographed onto the desired product film type using a conventional camera, thereby producing second-generation camera-original photographs of the computer-originated image. These second-generation photographs are chemically developed, yielding the desired photoprocessing or graphic arts control tool.

Also, instead of photographing the digitally-generated transparency (or other medium) using a conventional camera and developing the resulting photograph, other means of producing the photoprocessing control tool can be used. This could include, for example, projecting the digitally-generated transparency onto the product film type using a photographic enlarger.

The methods used in the present invention result in large numbers of product control tool photographs being produced in a much shorter time frame than that in the traditional method. Operator error is eliminated since the photographing of the illuminated transparency is performed in an automated, robotized manner. This results in an improvement in cosmetic and sensitometric uniformity in the population of product control tool photographs that are produced.

Those skilled in the photographic art will note that because photographic films and other recording media are sensitive to different portions of the light spectrum (i.e., have different spectral sensitivities) it is unlikely that any two different product film types will record the transparency of the computer-originated image exactly the same when the transparency is photographed onto those film types. (The ramifications of this phenomenon will be discussed in the detailed description of an embodiment of the invention.) The ability to accommodate (and calibrate the "second-generation camera-original" system for) the different spectral sensitivities of different product film types by deriving a secondary target digital data metric into which the computer-originated image is transformed prior to being output as a transparency by the digital output recording device is a particularly advantageous feature of the present invention.

Other objects, advantages and novel features of the present invention will become apparent from the following detailed description of the invention when considered in conjunction with the accompanying drawings.

BRIEF DESCRIPTION OF THE DRAWINGS

FIG. 3a shows the first stage of the process according to an embodiment of the present invention.

FIGS. 3b and 3c show the second stage of the process according to an embodiment of the present invention.

DETAILED DESCRIPTION OF A PREFERRED EMBODIMENT

Prior to describing the process of the invention, the apparatus used for carrying out this process is briefly described below. The use of the apparatus in carrying out the steps of the process will be provided in more detail in the description of the process.

Figure 1:
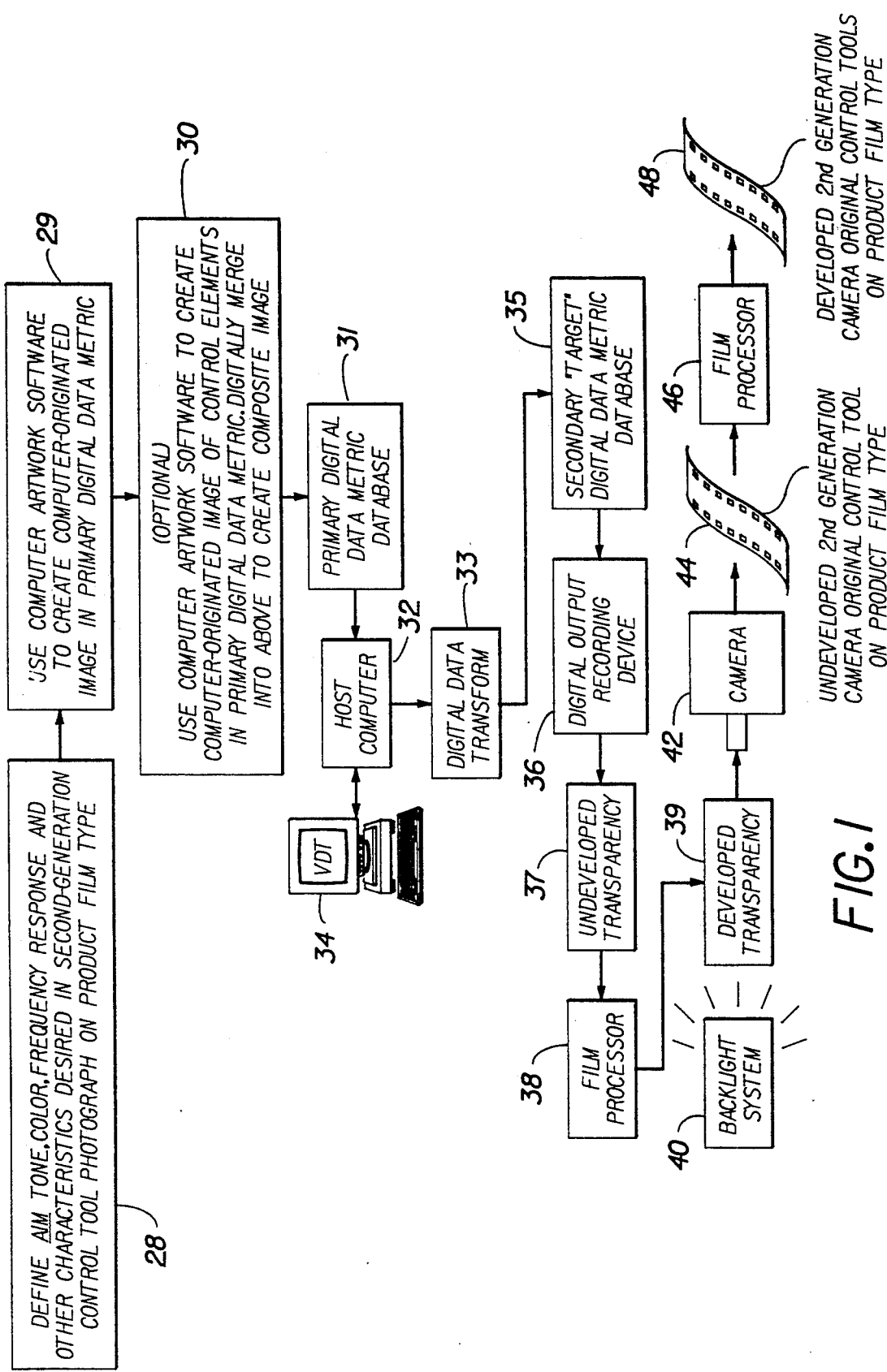
FIG. 1 shows an apparatus in accordance with an embodiment of the present invention for the production of second-generation camera-original control tool photographs via photography of digitally-generated calibrated transparencies of a computer-originated image.

FIG. 1 shows a diagrammatic illustration of the apparatus used to carry out the process according to a preferred embodiment of the present invention. The production of a second-generation camera-original photofinishing or graphic arts control tool 48 is begun by digitally creating, possibly via computer artwork software, computer-aided design software or "rendering algorithms", a computer-originated image 29 consisting of digital picture elements, or "pixels", whose values coincide with primary digital data metric values derived via a computer algorithm and which are listed in a digital data file and stored in a primary digital data metric database 31. Examples of such computer artwork software or rendering algorithms are Illustrator and Freehand (trademarks of Adobe Systems Incorporated).

In a preferred embodiment, the "aim" image characteristics desired of the second-generation control tool are defined as shown in step 28.

Selected photoprocessing or graphic arts control and identification elements can also be created digitally and can be digitally inserted into the primary metric version of the computer-originated image, if desired, to produce a composite digital image, as shown in step 30. If the computer-originated image is already one comprised of photoprocessing or graphic art control elements, the digital insertion of further control elements may be unnecessary.

The primary metric version of the computer-originated image is stored in a database 31 and coupled to a host digital image processor (host computer) 32.

This primary metric version of the computer-originated image is supplied in the form of imaging pixel array-representative bit maps, resolved to a prescribed code width (e.g. eight bits per pixel for each of the Red, Green and Blue color channels), to host computer 32. Host computer 32 contains an image encoding and storage operator through which each computer-originated image file is stored. Host computer 32 is interfaced with a video display terminal (VDT) 34 or workstation through which the primary metric version of the computer-originated image may be controllably called up for display to the operator user in the course of customizing that version of the computer-originated image.

The control mechanism that drives the video display terminal 34 may contain a simplified or edited version of bit map manipulation software, such as that supplied by a computer graphics vendor, which provides the operator user with the ability to access menu-driven image manipulation functions, such as the addition of text to the image, zoom, crop, and tone and color corrections. Non-limitative examples of readily coded image processing algorithms that may be used for this purpose include those described in the published literature, such as "Digital Image Processing" by William K. Pratt, in particular, Chapters 4, 12 and 16, respectively entitled "Image Sampling and Reconstructions," "Image Enhancement" and "Luminance, Color, and Spectral Image Restoration," 1978 John Wiley and Sons, ISBN 0-471-01888-0; and "Digital Image Processing" by Rafael C. Gonzalez, in particular, Chapter 4, entitled "Image Enhancement," 1983 Addison-Wesley Publishing Company, Inc. ISBN 0-201-02596-5. Many such image processing algorithms have been implemented as commercially available packages. Their encoding schemes are optimized for performance and are commercially available as libraries of subroutines, such as MathPAK 87 (trademark of Precision Plus Software). Additional image processing software that may be used includes Photoshop (trademark of Adobe Systems Incorporated), ColorStudio (trademark of Letraset) and PhotoMac (trademark of Avalon Development Group).

Digital images from the host computer 32 are digitally reproduced, after digital data transformation, via transform 33, from the primary metric 31 to the target digital image metric 35, by way of a high spatial resolution digital recording device 36, as a MacDonald-Dettweiler Associates Fire 1000 film recorder, as a positive transparency 37, onto a reversal film such as Kodak EKTACHROME 100 film. The positive transparency 37 is developed in film processor 38 in the conventional manner. The developed positive transparency 39 is backlit using backlighting system 40 and photographed onto the product film type 44 using a conventional camera 42. The photograph 44 is developed in the conventional manner in film processor 46, producing a second-generation camera-original photograph 48 (i.e. control tool) of the computer-originated scene on the product film type.

The image characteristics of the transparency 39 are selectively modified, if necessary, via the operation of the transform 33 and the host computer 32, until the image characteristics of the developed second-generation camera-original photograph 48 of the transparency match the image characteristics defined as "aim" in step 28.

The medium 37 onto which the digital image is recorded by the digital output recording device 36 need not be a transparency but can be, for example, thermal paper. If this is the case, then the backlight system 40 would be replaced by another appropriate lighting system (e.g., a frontlighting system).

Figure 2:
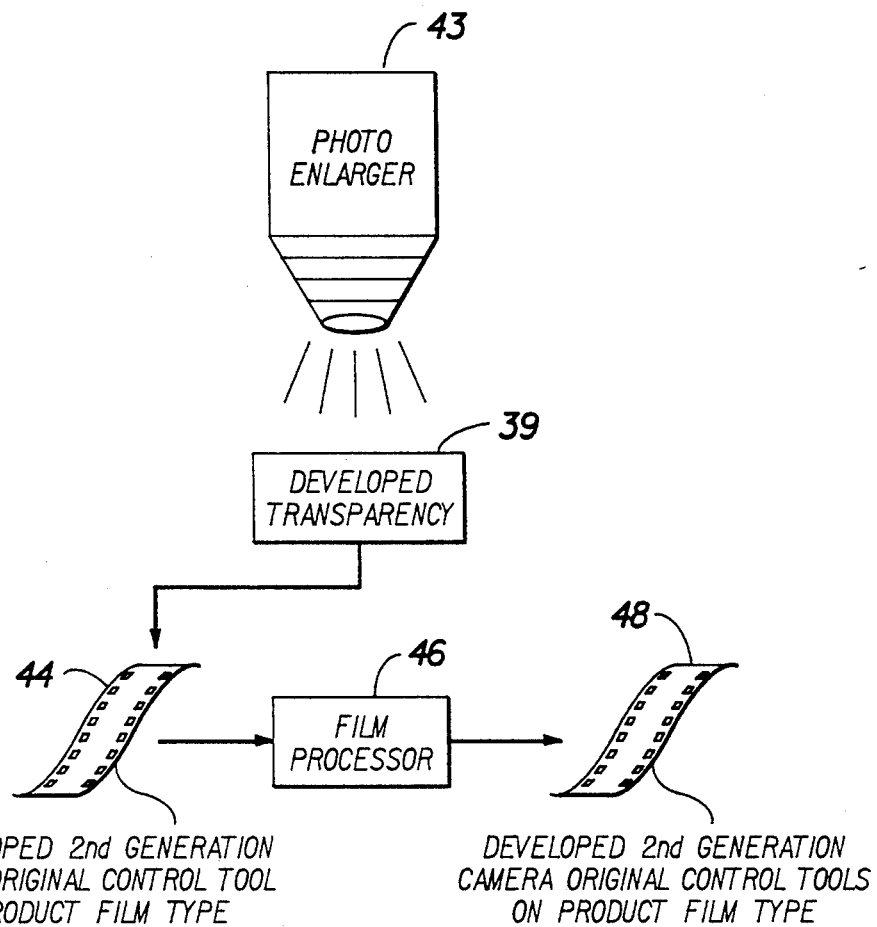
FIG. 2 shows an alternative embodiment of a portion of the apparatus of FIG. 1.

The camera 42 can be replaced, as illustrated in FIG. 2 by a photographic enlarger 43, or any other image capturing device that captures the image of the developed transparency 39 or other recording medium and produces a second-generation control tool 48.

Figure 3:
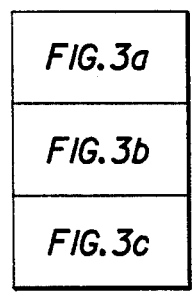
FIG. 3 shows the process according to an embodiment of the present invention.
Figure 4:
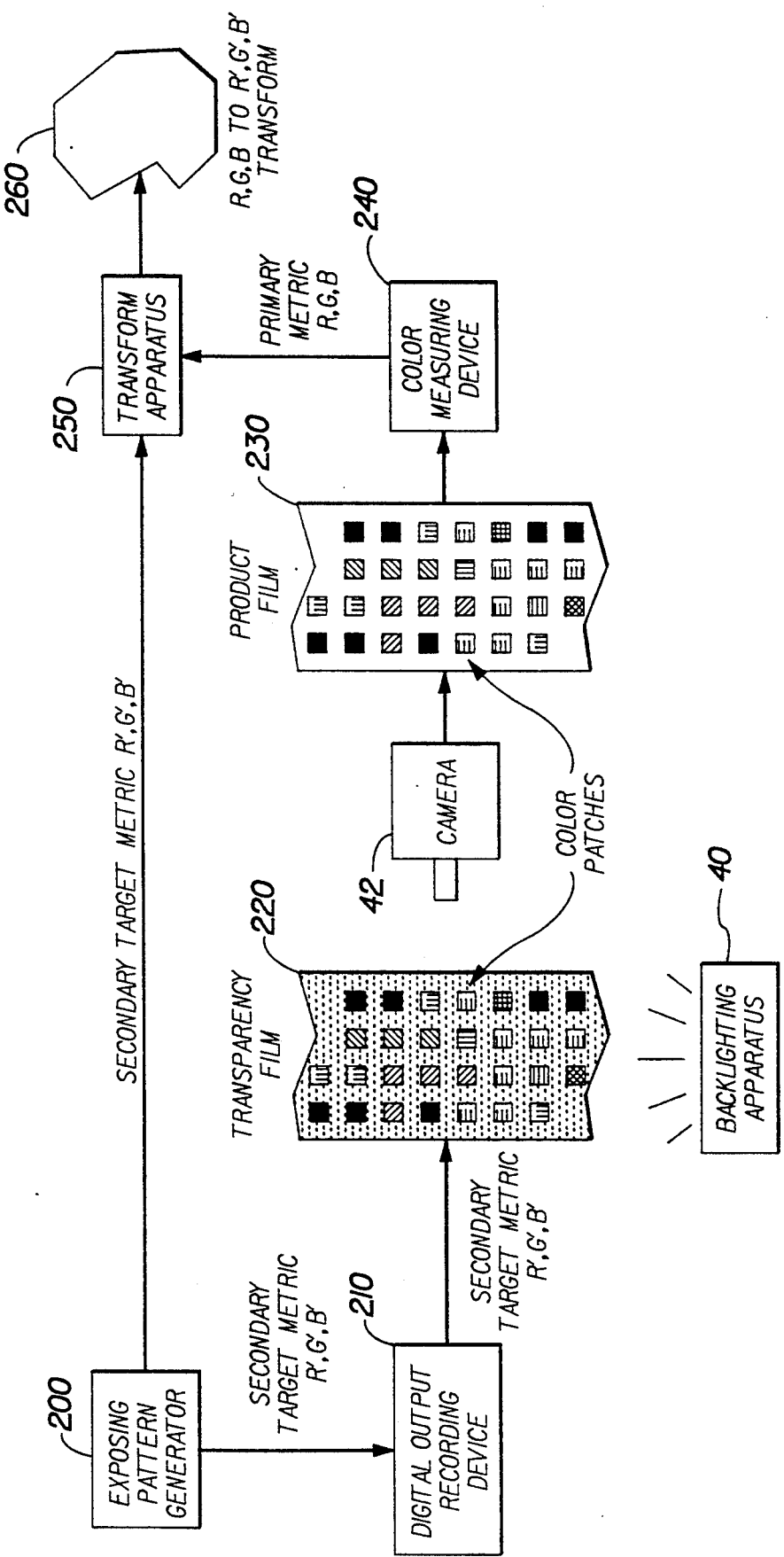
FIG. 4 shows the second stage of the process according to an alternative preferred embodiment of the present invention.

The process of the invention can be considered to comprise two stages. A preferred embodiment of Stage I is shown in FIG. 3a. A preferred embodiment of Stage II is shown in FIGS. 3b and 3c. A second preferred embodiment of Stage II is shown in FIG. 4.

In Stage I, the image characteristics desired of the second-generation camera-original control tool photograph 48 are defined in step 94. Steps 95 and 95a relate to the digital creation, via computer artwork, computer aided design or image rendering software, of a computer-originated image 29 (as well as the optional creation of a second computer-originated image of control elements 30 which may be digitally merged into the first image 29) in a primary digital data metric and the storage of that primary metric version of the image in the primary metric database 31. Step 95a relates specifically to the optional digital insertion of control and identification elements (i.e., labels) into the primary digital data metric version of the image.

The primary metric version of the computer-originated image, stored in the primary digital metric database (31 in FIG. 1) is represented in step 96 of FIG. 3a. This primary metric version of the image is coupled to a host computer 32 through which subsequent digital image processing is used via the digital data transform 100 (33 in FIG. 1) to convert the image to a secondary, target metric 35, required of the digital output recording device 36. (The derivation of the transform 100 will be described below). The target metric version of the computer-originated image is shown in step 101 of FIG. 3b.

This concludes Stage I of the process according to the present invention.

A preferred embodiment of Stage II of the process of the current invention, shown in FIGS. 3b and 3a, relates to the development of a digital data transform, shown as step 100 in FIG. 3b, and to the calibration of the system by which the digitally-generated transparency 103 (39 in FIG. 1) and the second-generation camera-original control tools (48 in FIG. 1) are produced. Step 96 (from Stage I) is again pictured, as a dashed box, merely to show the connection between Stage I and Stage II.

The purpose of the digital data transform 100 is to convert the primary digital image data metric version of the computer-originated image 96 to the secondary, target digital image data metric version of the image 101 (35 in FIG. 1) required of the digital output recording device 36. The digital output recording device is used to produce transparencies 102 (37 in FIG. 1) which may be developed 102a in film processor 38. The developed transparency 103 (39 in FIG. 1) may then be backlit and photographed as shown in step 104, using camera 42 to predictably obtain precision-quality, calibrated second-generation camera-original control tool photographs on the product film type 48 whose image characteristics match those image characteristics defined as aims 94 (28 in FIG. 1) for the product film type 44. As stated earlier, the digital output recording device 36 can also be configured to produce images on other types of media than transparencies, e.g., thermal prints. Such prints may require another type of lighting system when being photographed to yield the product second-generation photographs. Additionally, other means for obtaining the second-generation photographs can be used. This may include a conventional photographic enlarger, for example, as illustrated in FIG. 2.

The components of transform 100 may include, but need not be limited to, particular one-dimensional mapping operations, multi-dimensional "look-up-tables" and/or matrix operators, the uses of which are familiar to those skilled in the art of digital image processing or other types of data-transforming operations. The derivation of the particular components of a transform that results in the production of a digitally-generated transparency, deemed to be in the target metric, and, hence, "calibrated" for a given product film type, may be based upon photographic iterations such as those described below.

The components of transform 100 may be chosen so as to address (and modify, if necessary) the tone, color and frequency response characteristics of the digitally generated transparency.

In the present invention, a digital enhancement filter is included as a component of transform 100. The frequency response of the digital image may be enhanced via a digital filter to compensate for any degradation of frequency response that may occur when the digitally-generated transparency or other output medium produced from that digital image is photographed or otherwise recorded. Use of such a filter produces a final product second-generation camera-original photograph on the film type with the desired frequency response defined as the aim 94 (28 In FIG. 1) for the product film type. The degree to which the frequency response of the digitally-generated transparency is enhanced depends upon the optics of the conventional camera used to photograph the transparency (or other output medium) as well as the frequency response characteristics of the product film on which the second-generation control tool photographs are being produced. Separate digital filters may be developed for each particular application of the second-generation camera-original technique. The creation and use of digital filters for the purpose of enhancing the frequency response of a digitally generated image is understood by those with ordinary skill in the art of digital image processing.

With respect to the tone and color characteristics of the digitally-generated transparency (output medium) and, hence, the need for what has been referred to as a "target" metric produced via the application of transform 100, it must be noted that a goal of the present invention is to generate a transparency (or other output medium) which, when backlit (or otherwise lighted) and photographed by the conventional camera, photographic enlarger or other image capturing device onto the product film type, produces second-generation camera-original photographs on the product film type whose tone and color characteristics match those defined as the aim characteristics for the product film type.

It is important to note that a transparency which is digitally-generated directly from the primary metric may not necessarily serve to produce second-generation camera-original photographs on the product film type whose image characteristics meet the criteria defined in step 94 (28 in FIG. 1). A secondary target metric may need to be determined.

Those skilled in the photographic art will note that the densities formed on a developed photographic exposure 48 of an illuminated transparency of a computer-originated image 39 depend upon the spectral transmittance characteristics of the imaging dyes that form the densities on the transparency medium upon which the image has been produced by the digital output recording device, the intensity and spectral characteristics of the lighting system 40 used to illuminate the transparency, the spectral sensitivity characteristics of the product film 44 used in the photography of the transparency, the amount of exposure given (i.e., shutter speed and lens aperture used) to that product film by the camera 42 (or other image capturing device), the complex interlayer interactions in the product film, and the photochemical processing conditions encountered by the product film during chemical development in the film processor 46.

In the case where the medium used by the digital output recording device 36 to produce the image 39 is a reflection rather than a transparency medium (e.g., a photographic print) the spectral reflectance characteristics of the reflection medium would be substituted for the spectral transmittance characteristics of the transparency medium in the preceding paragraph.

To produce a second-generation camera-original photograph, on the product film type, whose image characteristics match those defined as aim for that product film type, modifications may have to be made to one or more of the variables described above in reference to the production of the digitally-generated transparency of the computer-originated image.

In the preferred embodiment of the present invention, the lighting system 40 used to backlight the transparency 39, the spectral sensitivity characteristics of the product film 44, the amount of exposure given to the product film by the camera 42, the interlayer interactions in the product film and the photochemical processing conditions encountered by the product film during chemical development 46 are all fixed. In that case, the densities resident in the digitally-generated transparency 39 may be modified in order to achieve the match described.

This modification of the densities formed in the digitally-generated transparency 39 is accomplished by converting the primary metric version of the image 96 to a secondary target metric version of the image 101 via the digital data transform 100.

Digital data in the target metric, which may result from application of the digital data transform 100, provided to a particular digital output recording device 36, will produce a digitally-generated transparency 39 whose image characteristics meet the criteria necessary for a second-generation camera-original photograph 48 of that backlit transparency, on the product film type, to match the image characteristics defined as aim for that product film type.

Comparison of the image characteristics produced on the product second-generation camera-original photograph to the image characteristics defined as aim for the product film determines what, if any, changes are required to the digital data transform 100.

The method by which transform 100 is derived, as performed by one preferred embodiment, may be iterative in nature. This derivation begins with the generation, via the digital output recording device 36, of a transparency of the computer-originated image 103, using the primary digital data metric version of the image 96 as input to the digital output recording device as shown in step 102 of FIG. 3b. For the purpose of producing this initial transparency, the various data transforming operations that comprise transform 100 are set so as not to alter the primary metric version of the image.

A transparency of the computer-originated image is generated by the digital output recording device 36 after application of the current version of transform 100. The transparency is developed in film processor 38 as shown in step 102a of FIG. 3b. The developed transparency 39 is represented in step 103 in FIG. 3c.

In step 104, the transparency of the computer-originated image thus created is illuminated using backlighting system 40 and photographed onto the product film type, using a conventional optical camera 42. The resulting second-generation camera-original photograph is then chemically developed in film processor 46 as shown is step 110. In step 114, the tone, color and frequency response characteristics of the second-generation photograph on the product film type are measured using a color measuring device (e.g. a densitometer or colorimeter) and are evaluated relative to the image characteristics defined as aims for that product film type. A decision is made in decision step 116 to determine if the achieved image characteristics match the aim image characteristics for the product film type to within predetermined limits. If the image characteristics do not match to within these limits, one or more of the components of transform 100 may be modified, in step 118, and steps 100–116 are reiterated. If the image characteristics achieved on the product film type do match the aim image characteristics for the product film type, an acceptable secondary target digital data metric has been achieved and the transform 100 is deemed correct for that particular product film type.

The target metric, to which the primary metric version of the computer-originated image is transformed, results in a transparency which, when photographed onto the product film type produces a second-generation camera-original control tool photograph whose image characteristics match the image characteristics defined as aims for that product film type.

A second preferred embodiment provides for an alternative method and means for the derivation of a digital data transform 260, which converts a primary metric version of a computer-originated image to a target metric version of that image.

For the purpose of this second embodiment, the version of the image whose characteristics correspond to the "aim" characteristics defined for the product second-generation photograph should be thought of as residing in the primary data metric. (In the first embodiment the primary metric version of the image was a "starting" image whose characteristics were not necessarily defined as "aims.")

It should be remembered that a target metric version of an image is that version which, when supplied to the digital output recording device, produces a transparency that, when photographed onto a product film type yields the image characteristics defined as "aim" characteristics for the product second-generation photograph.

This second embodiment does not require photographic iterations as does the embodiment mentioned previously for the derivation of transform 100. Instead, the method of this second embodiment effectively "characterizes" the second-generation camera-original system by providing known target metric exposure pattern values to the digital output recording device and by deriving a relationship between these known input values and the resulting primary metric values obtained, via a color measuring device, from the product second-generation photographs.

FIG. 4 illustrates diagrammatically the process for deriving a transform 260 via this alternate embodiment. Exposure patterns, chosen to adequately sample the useful exposure range of the transparency (or other) medium used by the digital output recording device 210, are created, using an exposing pattern generator 200. The exposure pattern values are provided as input to the digital output recording device and produce exposures on the transparency medium thus creating a test image transparency consisting of approximately 400 color patches. The exposure pattern values used as input to the digital output recording device may be considered to be in the target digital data metric.

The transparency is developed in the conventional manner in film processor 38. The developed test image transparency 220 is illuminated and photographed onto the product film type, using the same backlighting apparatus 40 and camera 42 (or other image capturing device 43) to be used in the production of the second-generation camera-original control tool photographs 48. This second-generation camera-original photograph 230 is developed in the conventional manner in film processor 46.

The color patches on this developed second-generation photograph 230 of the backlit test image transparency 220 are measured using any of a plurality of color measuring devices (e.g. a densitometer or colorimeter) 240 to produce values corresponding to each color patch. These values can be considered to be in the primary digital data metric if an appropriate measuring device is used. For example, if the primary metric is Status A density, then a Status A densitometer would provide measurements in terms of the primary data metric. As another example, if the primary data metric corresponds to colorimetric parameters, such as CIE XYZ tristimulus values, then a colorimeter may be used to provide measurements in terms of the primary data metric. It will be understood that colorimetric calculation techniques known in the art may also be used to convert the measurements into the primary data metric.

Transform apparatus 250 creates a digital data transform 260 relating the primary metric values for the color patches formed on the product second-generation photograph 230 of the backlit color patch test image transparency 220 to the target metric values used by the digital output recording device to produce the color patches of the test image transparency itself. The transform 260 may consist of a series of operations which may include, but would not be limited to, one dimensional look-up-tables, multi-dimensional look-up-tables, matrix operators and/or other digital data transforming operations, the uses of which are familiar to those skilled in the art of digital image processing.

Figure 5:
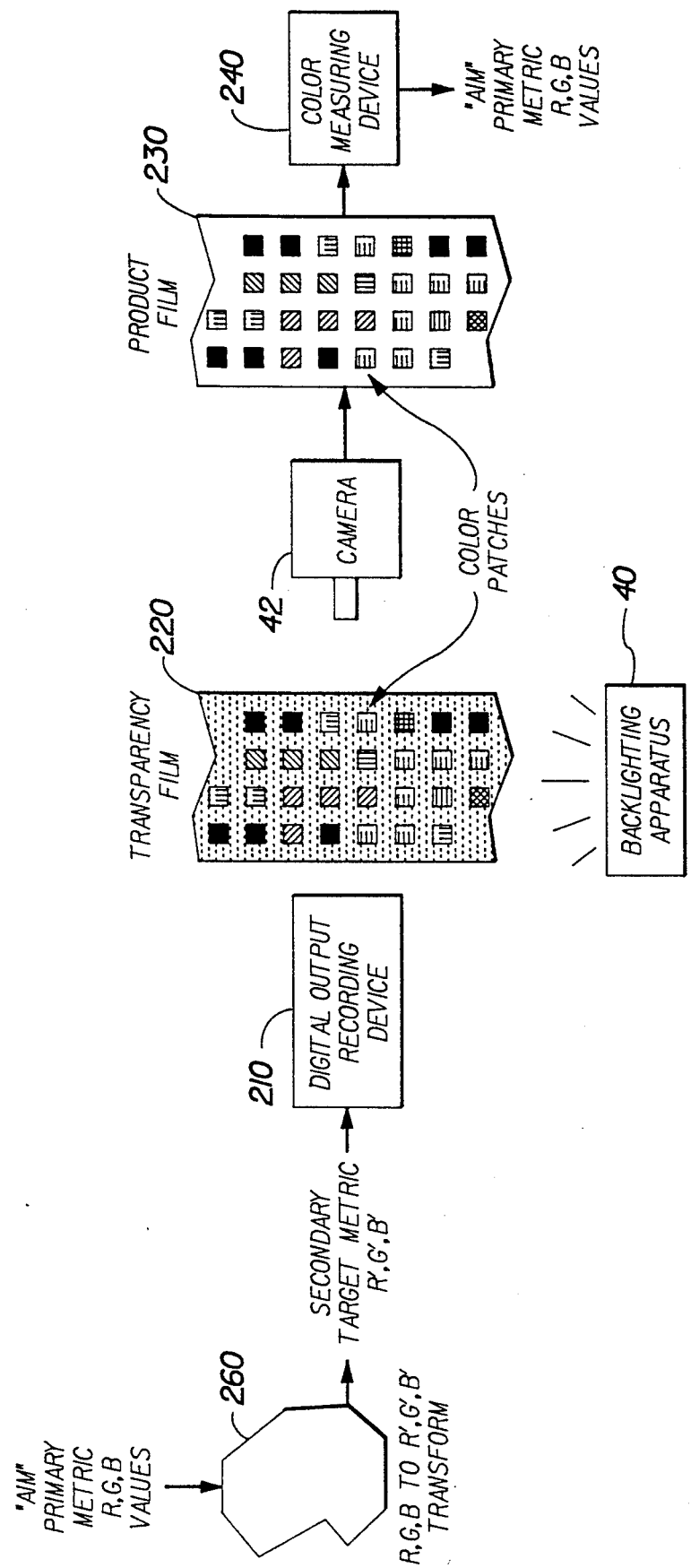
FIG. 5 shows one manner in which the second stage of the second embodiment may be applied.

The application transform 260 is shown in FIG. 5. Transform 260 serves a similar purpose as transform 100, i.e., to convert a primary metric version of a computer-originated image 96 to the secondary, target metric version of the computer-originated image 35 required of the digital output recording device 210 (36 in FIG. 1). For example, the aim tone and color characteristics of a product second-generation camera-original color chart control tool may be specified by the particular Status A densities desired for each color patch contained in the chart. These "aim" densities serve as input to transform 260 which provides corresponding target metric code values to the digital output recording device 210. The digital output recording device 210 uses these values to generate a transparency 220 (39 in FIG. 1). The transparency is backlit and photographed onto the product film type (44 in FIG. 1). The photograph is developed to yield the second-generation camera-original control tools 230 (48 in FIG. 1) which may be measured using a densitometer calibrated in terms of Status A response. The Status A densities of the color patches of the product control tools should be identical to the densities originally specified.

As an alternate example, if the aim tone and color characteristics of a product second-generation camera-original color chart control tool were specified in terms of particular colorimetric values (e.g. CIE L*a*b*) desired for each color patch contained in the chart, these values would serve as input to an alternate transform 260. Transform 260 would again provide corresponding target metric code values to the digital output recording device 36. A transparency would be produced, photographed onto a product film type and the resulting second-generation photograph measured. In this case the color measuring device would be one that was calibrated in terms of CIE L*a*b* values. The values measured on the second-generation photograph should, again, be identical to the values specified as "aims."

Once the transform 100 and, therefore, the target metric, have been deemed correct for a given product film type, a transparency of the computer-originated image is produced by the digital output recording device using the target metric version of the image. That transparency is provided to the client and is used in the mass production of calibrated second-generation camera-original control tool photographs onto that particular product film type.

With respect to decision step 116, it is the client who specifies the criteria that define to what degree the image characteristics of the product second-generation camera-original control tool photographs must match the aim image characteristics.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method for making product second-generation reproduction images from digital images, said reproduction images exhibiting desired image attributes, comprising the steps of:
   a. creating a first digital image in terms of a first digital data metric using a computer image rendering means;
   b. producing a first intermediate image on a first imaging means from said first digital image using a digital image-producing means;
   c. measuring said first intermediate image to determine the image attributes of said image;
   d. forming an initial second-generation reproduction image on a second imaging means by capturing said first intermediate image;
   e. measuring said initial second-generation reproduction image to determine the image attributes of said image;
   f. deriving at least one digital image data transform based upon the relationship among the attributes of said initial second-generation reproduction image, said initial intermediate image, and the desired image attributes for the product second-generation reproduction image;
   g. applying said transform to said first digital image to create a second digital image in terms of a second digital data metric;
   h. producing a second intermediate image on said first imaging means from said second digital image using said digital image-producing means; and
   i. forming the product second-generation reproduction image on said second imaging means by capturing said second intermediate image.

2. The method according to claim 1 further comprising the steps of:
   j. measuring the product second-generation reproduction image to determine the image attributes of said image;
   k. modifying said digital image data transform in accordance with the difference between the product second-generation reproduction image attributes and said desired attributes; and
   l. iterating steps g. through k. until the product second-generation reproduction image exhibits the desired image attributes.

3. The method according to claim 1 wherein said image attributes include sharpness, color, and tone reproduction.

4. The method according to claim 1 wherein said digital image data transform is applied to any of a plurality of digital images which are in terms of said first digital data metric.

5. The method according to claim 1 wherein said digital image data transform is stored for subsequent use by any of a plurality of digital images which are in terms of said first digital data metric.

6. The method according to claim 1 wherein said second digital image is formed by merging elements of one or more digital images which are in terms of said second digital data metric.

7. A method for making product second-generation reproduction images having colors of specified chromatic values comprising the steps of:
   a. specifying calibration signal values representing the signal value range of a digital imaging means;
   b. forming first intermediate colors on a first image-producing means from said calibration signal values using said digital imaging means;
   c. forming calibration colors on a second image-producing means by capturing said first image-producing means' first intermediate colors;
   d. determining chromatic values for said calibration colors;
   e. deriving at least one transform by relating said calibration colors' chromatic values to corresponding said calibration signal values;
   f. modifying the specified chromatic values via said transform to form signal values;
   g. forming second intermediate colors on said first image-producing means from said signal values using said digital imaging means; and
   h. forming the product second-generation reproduction images having colors of specified chromatic values on said second image-producing means by capturing said first image-producing means' second intermediate colors.

8. A method for making product second-generation reproduction images from digital images, said reproduction images exhibiting desired image attributes, comprising the steps of:
 a. creating a first digital image in terms of a first digital data metric using a computer image rendering means;
 b. producing a first intermediate image on a first imaging means from said first digital image using a digital image-producing means;
 c. monitoring image-producing characteristics of said first imaging means;
 d. measuring said first intermediate image to determine the image attributes of said image;
 e. forming an initial second-generation reproduction image on a second imaging means by capturing said first intermediate image;
 f. monitoring image-producing characteristics of said second imaging means;
 g. measuring said initial second-generation reproduction image to determine the image attributes of said image;
 h. deriving at least one digital image data transform based upon the relationship among the attributes of said initial second-generation reproduction image, said initial intermediate image, and the desired image attributes for the product second-generation reproduction image, and information obtained from monitoring said first and said second imaging means;
 i. applying said transform to said first digital image to create a second digital image in terms of a second digital data metric;
 j. producing a second intermediate image on said first imaging means from said second digital image using said digital image-producing means; and
 k. forming the product second-generation reproduction image on said second imaging means by capturing said second intermediate image.

9. The method according to claim 8 further comprising the steps of:
 l. monitoring image-producing characteristics of said second imaging means;
 m. measuring the product second-generation reproduction image to determine the image attributes of said image;
 n. modifying said digital image data transform in accordance with the difference between the product second-generation reproduction image attributes and said desired attributes and information obtained from monitoring said second imaging means; and
 o. iterating steps i. through n. until the product second-generation reproduction image exhibits the desired image attributes.

10. Apparatus for making product second-generation reproduction images from digital images, said reproduction images exhibiting desired image attributes, comprising:
 means for creating a first digital image in terms of a first digital data metric using a computer image rendering means;
 means for producing a first intermediate image on a first imaging means from said first digital image using a digital image-producing means;
 means for measuring said first intermediate image to determine the image attributes of said image;
 means for forming an initial second-generation reproduction image on a second imaging means by capturing said first intermediate image;
 means for measuring said initial second-generation reproduction image to determine the image attributes of said image;
 means for deriving at least one digital image data transform based upon the relationship among the attributes of said initial second-generation reproduction image, said initial intermediate image, and the desired image attributes for the product second-generation reproduction image;
 means for applying said transform to said first digital image to create a second digital image in terms of a second digital data metric;
 means for producing a second intermediate image on said first imaging means from said second digital image using said digital image-producing means; and
 means for forming the product second-generation reproduction image on said second imaging means by capturing said second intermediate image.

11. The apparatus of claim 10 further comprising:
 means for measuring the product second-generation reproduction image to determine the image attributes of said image;
 means for modifying said digital image data transform in accordance with the difference between the product second-generation reproduction image attributes and said desired attributes; and
 means for iterating steps g. through k. until the product second-generation reproduction image exhibits the desired image attributes.

12. The apparatus of claim 10 further comprising a means for storing said digital image data transform for subsequent use by any of a plurality of digital images which are in terms of said first digital data metric.

13. Apparatus for making product second-generation reproduction images having colors of specified chromatic values comprising:
 means for specifying calibration signal values representing the signal value range of a digital imaging means;
 means for forming first intermediate colors on a first image-producing means from said calibration signal values using said digital imaging means;
 means for forming calibration colors on a second image-producing means by capturing said first image-producing means' first intermediate colors;
 means for determining chromatic values for said calibration colors;
 means for deriving at least one transform by relating said calibration colors' chromatic values to corresponding said calibration signal values;
 means for modifying the specified chromatic values via said transform to form signal values;
 means for forming second intermediate colors on said first image-producing means from said signal values using said digital imaging means; and
 means for forming the product second-generation reproduction images having colors of specified chromatic values on said second image-producing means by capturing said first image-producing means' second intermediate colors.

14. Apparatus for making product second-generation reproduction images from digital images, said reproduction images exhibiting desired image attributes, comprising:

means for creating a first digital image in terms of a first digital data metric using a computer image rendering means;

means for producing a first intermediate image on a first imaging means from said first digital image using a digital image-producing means;

means for monitoring image-producing characteristics of said first imaging means;

means for measuring said first intermediate image to determine the image attributes of said image;

means for forming an initial second-generation reproduction image on a second imaging means by capturing said first intermediate image;

means for monitoring image-producing characteristics of said second imaging means;

means for measuring said initial second-generation reproduction image to determine the image attributes of said image;

means for deriving at least one digital image data transform based upon the relationship among the attributes of said initial second-generation reproduction image, said initial intermediate image, and the desired image attributes for the product second-generation reproduction image, and information obtained from monitoring said first and said second imaging means;

means for applying said transform to said first digital image to create a second digital image in terms of a second digital data metric;

means for producing a second intermediate image on said first imaging means from said second digital image using said digital image-producing means; and means for forming the product second-generation reproduction image on said second imaging means by capturing said second intermediate image.

15. The apparatus of claim 14 further comprising:

means for monitoring image-producing characteristics of said second imaging means;

means for measuring the product second-generation reproduction image to determine the image attributes of said image;

means for modifying said digital image data transform in accordance with the difference between the product second-generation reproduction image attributes and said desired attributes and information obtained from monitoring said second imaging means; and means for iterating steps i. through n. until the product second-generation reproduction image exhibits the desired image attributes.

* * * * *